(12) United States Patent
Kang et al.

(10) Patent No.: US 8,675,916 B2
(45) Date of Patent: Mar. 18, 2014

(54) USER INTERFACE APPARATUS AND METHOD USING MOVEMENT RECOGNITION

(75) Inventors: Woo-Sung Kang, Hwaseong-si (KR); Mu-Sik Kwon, Seoul (KR); Jung-Rim Kim, Suwon-si (KR); Seong-Taek Hwang, Pyeongtaek-si (KR); Dong-Hyuk Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 190 days.

(21) Appl. No.: 13/285,314

(22) Filed: Oct. 31, 2011

(65) Prior Publication Data

US 2012/0106792 A1 May 3, 2012

(30) Foreign Application Priority Data

Oct. 29, 2010 (KR) ........................ 10-2010-0107344

(51) Int. Cl.
 *G06K 9/00* (2006.01)
 *H04N 5/238* (2006.01)
(52) U.S. Cl.
 USPC ............................ 382/103; 382/165; 348/365
(58) Field of Classification Search
 USPC ................. 382/100, 103, 106–107, 117–118, 382/162–165, 168, 173, 181, 190, 194, 199, 382/209, 232, 254, 274–276, 286–292, 305, 382/312; 348/349, 365
 See application file for complete search history.

(56) References Cited

U.S. PATENT DOCUMENTS

| | | | |
|---|---|---|---|
| 8,014,567 B2 * | 9/2011 | Yoon et al. | 382/103 |
| 8,204,312 B2 * | 6/2012 | Irie et al. | 382/190 |
| 8,213,737 B2 * | 7/2012 | Steinberg et al. | 382/275 |
| 8,290,210 B2 * | 10/2012 | Fahn et al. | 382/103 |
| 8,390,730 B2 * | 3/2013 | Takada et al. | 348/349 |
| 2008/0019589 A1 | 1/2008 | Yoon et al. | |

FOREIGN PATENT DOCUMENTS

KR 1020100056838 A 5/2010

* cited by examiner

*Primary Examiner* — Seyed Azarian
(74) *Attorney, Agent, or Firm* — The Farrell Law Firm, P.C.

(57) ABSTRACT

A movement recognition method and a user interface are provided. A skin color is detected from a reference face area of an image. A movement-accumulated area, in which movements are accumulated, is detected from sequentially accumulated image frames. Movement information corresponding to the skin color is detected from the detected movement-accumulated area. A user interface screen is created and displayed using the detected movement information.

20 Claims, 9 Drawing Sheets

USER INTERFACE APPARATUS AND METHOD USING MOVEMENT RECOGNITION

PRIORITY

This application claims priority under 35 U.S.C. §119(a) to a Korean Patent Application filed in the Korean Intellectual Property Office on Oct. 29, 2010 and assigned Serial No. 10-2010-0107344, the contents of which are incorporated herein by reference.

BACKGROUND OF THE INVENTION

1. Field of the Invention

The present invention relates generally to a user interface apparatus and method, and more particularly, to a user interface apparatus and method for recognizing hand movements.

2. Description of the Related Art

As computer system hardware continues to rapidly develop, artificial vision fields created by these computer system are increasingly applied to applications, such as, for example, image recognition, pattern recognition, and gesture recognition.

The field of gesture recognition has been used to deliver commands to machines via human intuitional behaviors.

The gesture recognition field has become one of the leading innovative technologies for games and Television (TV) remote controls through the use of artificial vision technology.

Similarly, in the field of sensors, hand position, pose and movement has been recognized using auxiliary equipment, such as, for example, an accelerometer, a gyro, and a haptic sensor.

The gesture recognition field using sensor technology has been applied to the field of precise control, which includes games, by processing information that is more precise and simple than the signals of an artificial vision system. The processed information is also used to create a movement database for a human being.

As described above, gesture recognition includes sensor-based methods and artificial vision-based methods.

The sensor-based methods recognize a gesture by precisely and quickly processing various human movements, which have a high degree of freedom, by directly acquiring speeds and positions of finger joints and hands as 3-dimensional spatial data.

The artificial vision-based methods detect a hand without a special tool by preserving presence/absence and position information of the hand, and detecting the hand by a skin color.

However, the sensor-based method of recognizing a gesture requires that sensors be attached and retained on a part of a human body. Further, it difficult to add new technology to a control system that includes the sensors of this method.

The artificial vision-based method of recognizing a gesture requires a significant amount of computation for hand detection, and also results in a high error rate when detecting a hand by identifying a skin color.

SUMMARY OF THE INVENTION

The present invention has been made to address at least the above problems and/or disadvantages and to provide at least the advantages described below. Accordingly, an aspect of the present invention provides a user interface apparatus and method for a gesture recognition that detects a hand through an interaction with a user by applying artificial vision technology that does not use additional sensors, does not require a large amount of computation, and has a low error detection rate.

According to one aspect of the present invention, a user interface apparatus that uses movement recognition is provided. The apparatus includes a skin color learning unit for detecting a skin color from a reference face area of an image. The apparatus also includes a movement-accumulated area detector for detecting a movement-accumulated area, in which movements are accumulated, from sequentially accumulated image frames. The apparatus further includes a movement detector for detecting movement information corresponding to the skin color from the detected movement-accumulated area. The apparatus additionally includes a user interface forming unit for creating and displaying a user interface screen using the detected movement information.

According to another aspect of the present invention, a movement recognition method of a user interface is provided. A skin color is detected from a reference face area of an image. A movement-accumulated area, in which movements are accumulated, is detected from sequentially accumulated image frames. Movement information corresponding to the skin color is detected from the detected movement-accumulated area. A user interface screen is created and displayed using the detected movement information.

BRIEF DESCRIPTION OF THE DRAWINGS

The above and other aspects, features and advantages of the present invention will become more apparent from the following detailed description when taken in conjunction with the accompanying drawing in which.

DETAILED DESCRIPTION OF EMBODIMENTS OF THE PRESENT INVENTION

Figure 1:
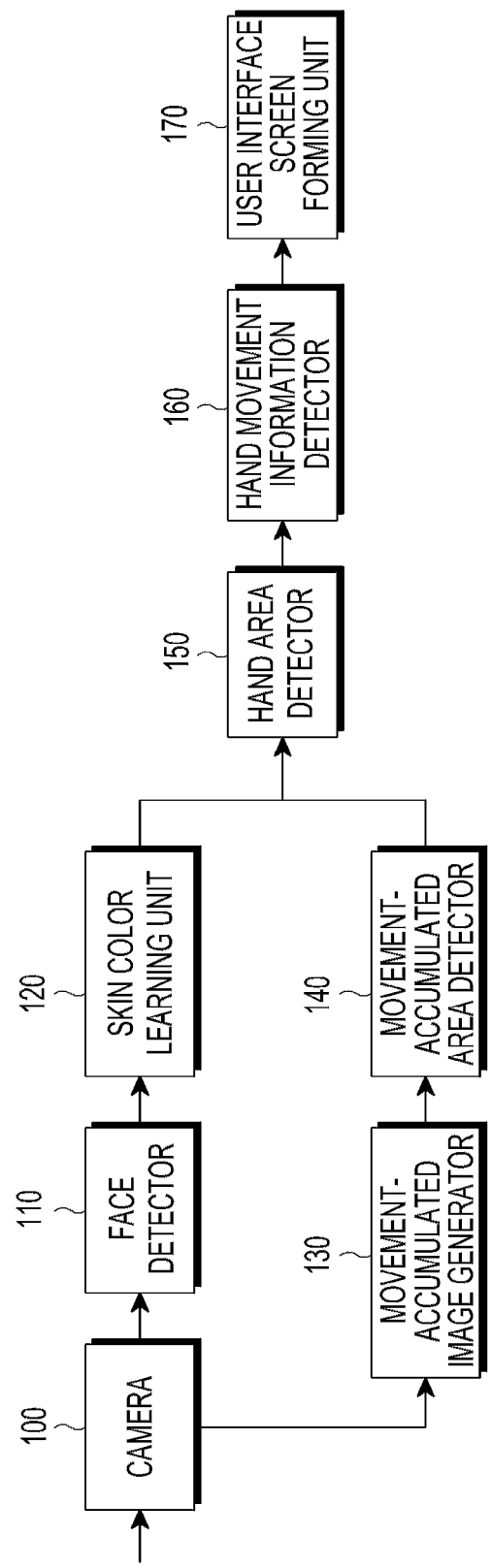
FIG. 1 is a block diagram of a user interface apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram illustrating a user interface apparatus, according to an embodiment of the present invention.

Referring to FIG. 1, the user interface apparatus may include a camera unit 100, a face detector 110, a skin color learning unit 120, a movement-accumulated image generator 130, a movement-accumulated area detector 140, a hand area detector 150, a hand movement information detector 160, and a user interface screen forming unit 170.

The camera unit 100 converts an optical signal that is input through a lens into an image, and outputs the image.

The face detector 110 detects a face from the image from the camera unit 100. The face detector 110 may detect the face through various existing face detection methods.

The face detector 110 determines whether a single face or a plurality of faces are detected from in the image. If a single face is detected, the face detector 110 sets the detected face as a reference face to be used for hand area detection.

When a plurality of faces are detected, if the faces are detected in the center of the image, the face detector 110 sets the reference face as a face having the largest size in the center of the image. If no faces are detected in the center of the input image, the face detector 110 sets the reference face as a face having the largest size in the image.

The skin color learning unit 120 learns a skin color using pixel color values in an area of the reference face. If the reference face is detected at a new position, the skin color learning unit 120 learns a new skin color since an illumination and a color of a facial image are changed.

The movement-accumulated image generator 130 generates a movement-accumulated image in which areas showing movements are sequentially accumulated. For example, the movement-accumulated image generator 130 may generate a movement-accumulated image by accumulating n pre-set difference image frames obtained from the most recently captured image frames of an image. Here, n is a natural number. In the movement-accumulated image, a movement area showing movements in the latest accumulated frames, from among the n accumulated difference image frames, has the highest movement-accumulated value.

This movement-accumulated image is used to filter a user's unintended movements, which occur due to the user's back-and-forth movements when deciding movement direction information.

The movement-accumulated area detector 140 determines the size of a movement-accumulated area, which corresponds with a size of the detected reference face in the movement-accumulated image generated by the movement-accumulated image generator 130. The movement-accumulated area detector 140 also detects a movement-accumulated area having the determined size. Specifically, the movement-accumulated area detector 140 detects a movement-accumulated area, which has a movement-accumulated value greater than 0, in the movement-accumulated image, in which the n difference image frames are accumulated.

Figure 17:
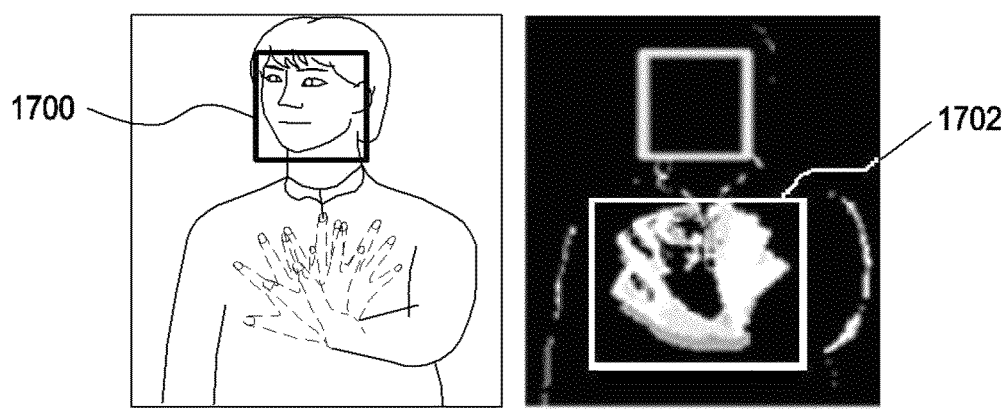

For example, with respect to FIG. 17, the movement-accumulated area detector 140 sets a movement prediction area, in which hand movements will be detected, around a position of the hand, which is recognized by waving the hand left and right near a face detection area 1700. The movement-accumulated area detector 140 detects a movement-accumulated area 1702 in which a movement-accumulated value is greater than 0 in the set movement prediction area, as shown in FIG. 17.

When there is a large distance between the user and the user interface apparatus, a user movement range is small and therefore a size of the movement prediction area to be detected is small. When there is a small distance between the user and the user interface apparatus, the user movement range is large and therefore the size of the movement prediction area is large. Since the distance between the user and the user interface apparatus is inversely proportional to a size of a detected face, the size of the movement prediction area varies according to sizes of detected faces.

Referring again to FIG. 1, the hand area detector 150 detects a hand area having color values corresponding to the skin color learned by the skin color learning unit 120 in the movement-accumulated area detected by the movement-accumulated area detector 140.

The hand movement information detector 160 detects movement information of hand area movements determined by identifying movements in the hand area detected in the movement prediction area, for consistency of movement determination.

Specifically, the hand movement information detector 160 sets a position at which the hand area is detected as a reference position and sets a movement area by accumulating a trajectory along which the hand area has sequentially moved from the set reference position. Thereafter, the hand movement information detector 160 determines a movement direction in which a size of the movement area increases according to time.

Since the size of the movement-accumulated area increases in a movement-initiated direction and decreases in the opposite direction according to back-and-forth hand movements, in order to filter unintended movements occurring due to the user's back-and-forth hand movements, the hand movement information detector 160 may recognize hand movements by determining a movement direction while the size of the movement-accumulated area is increasing.

The user interface screen forming unit 170 forms and displays a user interface screen according to the recognized hand movements.

In an embodiment of the present invention, in order for the user intuitively recognize his/her hand position, the user interface screen forming unit 170 forms a user interface screen to display the hand position.

For example, the user interface screen forming unit 170 may display an icon corresponding to the recognized hand position on a screen, and display arrow icons on the up, down, left and right sides of the displayed icon. Accordingly, the user interface screen forming unit 170 may allow the user to intuitively recognize hand movements by moving the icon corresponding to a hand position in the up, down, left, or right direction according to a recognized hand movement.

As described above, an embodiment of the present invention can be installed in low-priced systems for quick and simple sensing of hand movements through the detection of a hand area, which corresponds to a color extracted through skin color learning according to face detection, from a movement-accumulated image.

Figure 2:
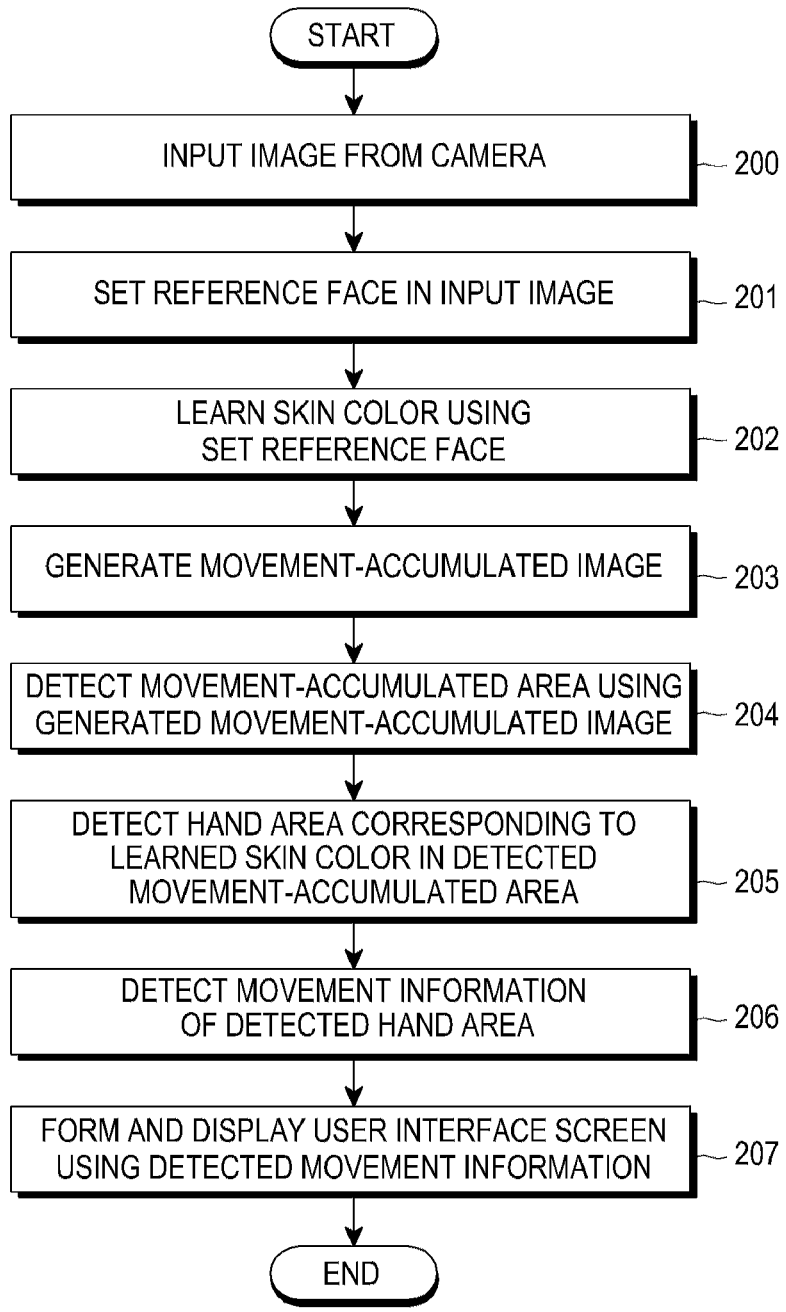
FIG. 2 is a flowchart illustrating a process of forming a user interface according to movements in the user interface apparatus, according to an embodiment of the present invention.

FIG. 2 is a flowchart illustrating a process of forming a user interface screen using movement recognition in the user interface apparatus, according to an embodiment of the present invention.

Referring to FIG. 2, when an image is input from the camera unit 100 in step 200, the face detector 110 sets a reference face to be used to detect a hand area in the image; in step 201. Step 201 is described in greater detail below with reference to FIG. 3.

Figure 3:
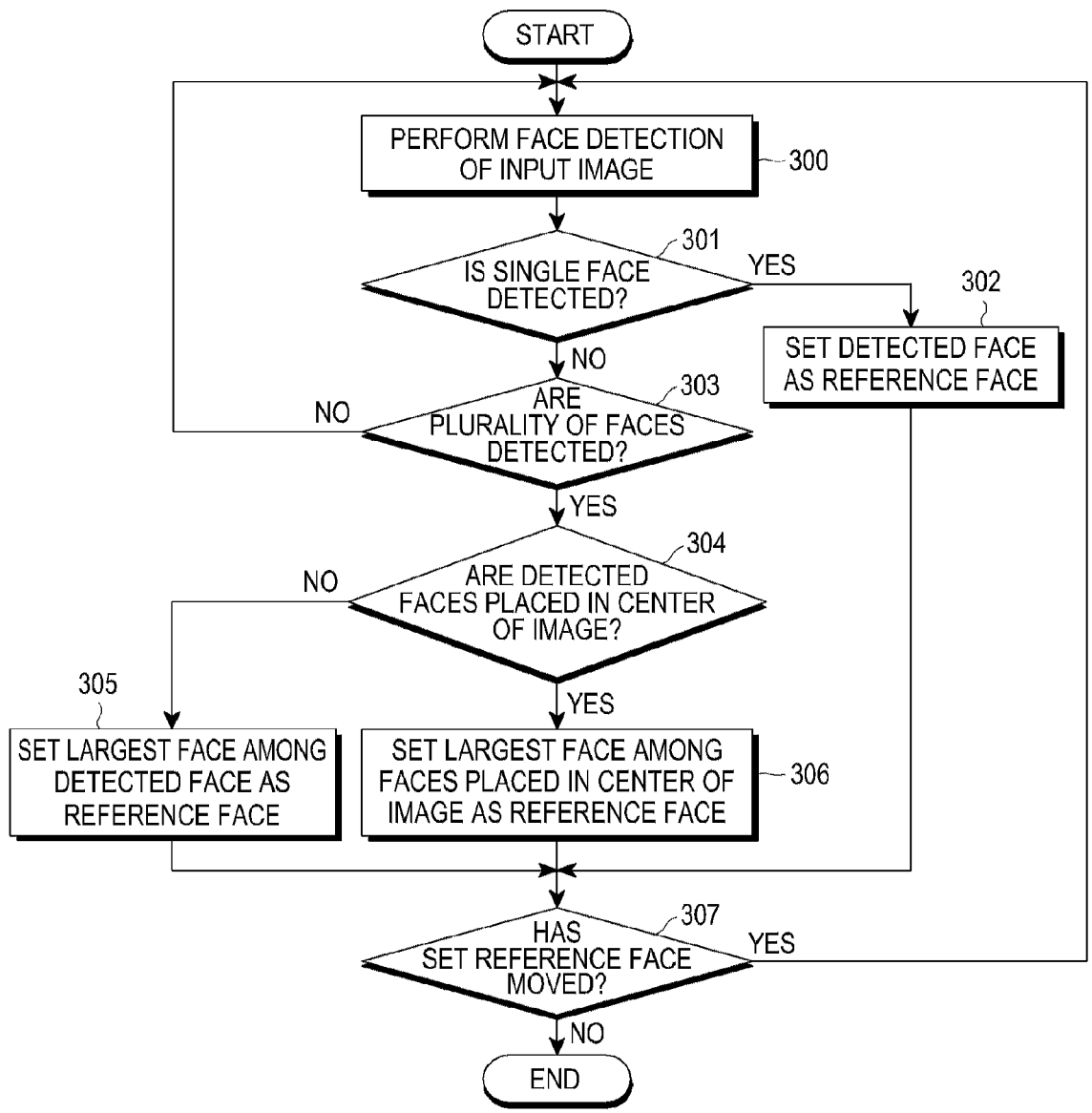
FIG. 3 is a flowchart illustrating a process of setting a reference face, according to an embodiment of the present invention.

FIG. 3 is a flowchart illustrating a process of setting a reference face by detecting a face area from an input image in the face detector 110, according to an embodiment of the present invention.

Referring to FIG. 3, in step 300, the face detector 110 performs face detection for an image. The face detector 110 may detect a face area by using any one of various face detection methods. For example, the face detector 110 may detect a face area through face learning information, such as a color and a position of a pre-set face model, and recognizing a face in the image through the face learning information.

Figure 4:
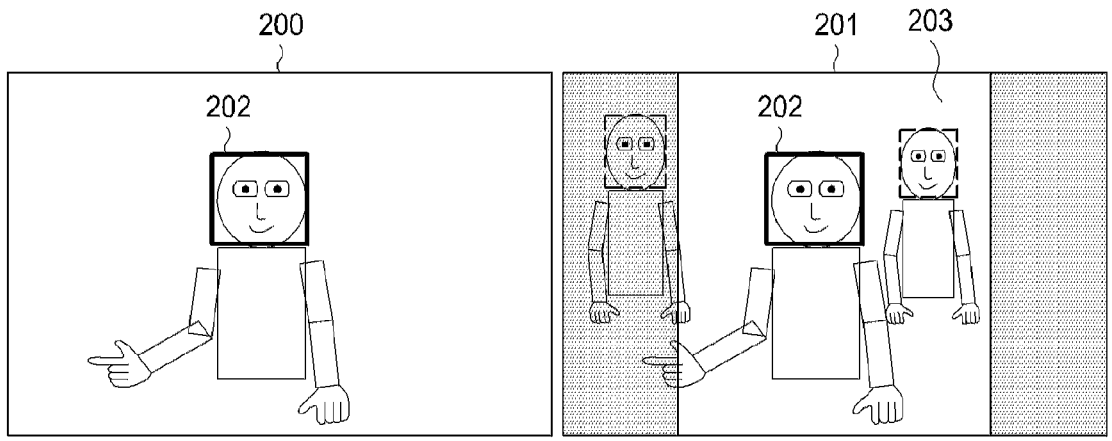
FIGS. 4 and 5 are diagrams illustrating the process of setting a reference face, according to an embodiment of the present invention.

In step 301, the face detector 110 determines whether a single face is detected. If a single face is detected, the face detector 110 proceeds to step 302 to set the detected face as a reference face. For example, as shown in FIG. 4, if a single face 202 is detected in an image 200, the detected face 202 is set as the reference face. If a single face is not detected, the face detector 110 proceeds to step 303.

In step 303, the face detector 110 determines whether a plurality of faces are detected. If a plurality of faces are detected, the face detector 110 proceeds to step 304. If a plurality of faces are not detected, the face detector 110 returns to step 300 and continues to perform face detection for an image.

In step 304, the face detector 110 determines whether any of the plurality of detected faces are located at a center of the image. If any of the plurality of detected faces are located at the center of the input image, the face detector 110 proceeds to step 306. If none of the plurality of detected faces are located at the center of the input image, the face detector 110 proceeds to step 305 to set the largest face among the plurality of detected faces as the reference face.

In step 306, the face detector 110 sets the largest face among the detected faces in the center of the input image as the reference face. For example, as shown in FIG. 4, the face detector 110 sets the largest face 202, from among the two faces located in a center area 203 of an image 201, as the reference face.

In step 307, the face detector 110 determines whether the set reference face has moved. If the set reference face has moved, the face detector 110 returns to step 300 and continues to perform face detection for an image. If the set reference face has not moved, the face detector 110 ends the process of setting the reference face.

The face detector 110 periodically checks whether the reference face has moved, and every time the reference face moves, the face detector 110 performs an operation for setting a new reference face.

Figure 5:
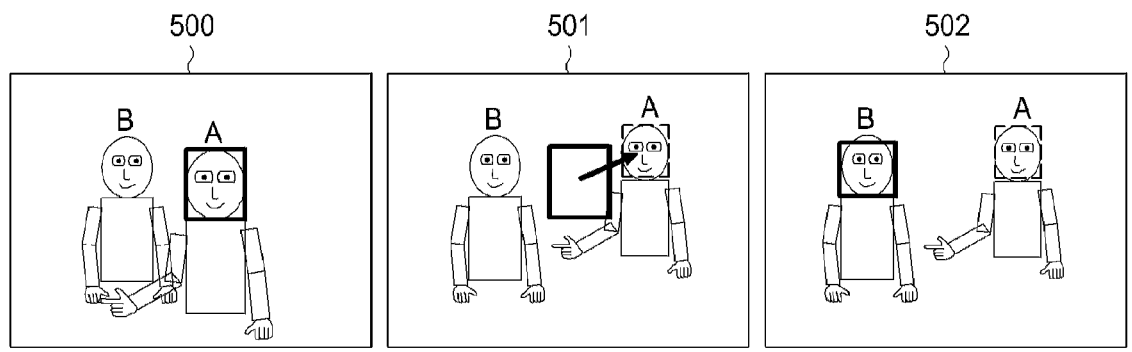

For example, as shown in FIG. 5, when A indicates a reference face in an image 500, if A has a smaller face area than B due to movement of A in an image 501, the face detector 110 may set B as the reference face, as shown in image 502, by reperforming the process of setting the reference face.

Referring back to FIG. 2, in step 202, the skin color learning unit 120 learns a skin color using the reference face.

Specifically, the skin color learning unit 120 performs Gaussian learning of color probability distribution values from the reference face.

When the skin color learning unit 120 learns the color probability distribution values from the reference face, the skin color learning unit 120 calculates a mean color probability distribution value for the reference face using Equation (1) below.

$$p(u) = \exp \frac{1}{\sqrt{2\pi|\Sigma|}} \left(-(u-m)^T \sum\nolimits^{-1} (u-m)\right) \quad (1)$$

Here, u=(Cr, Cb) denotes a vector consisting of Cr and Cb values, m denotes a mean vector of Cr and Cb values, which is calculated from a reference face, and Σ denotes a covariance matrix of u and m.

Thereafter, the skin color learning unit 120 may define a skin color using color values within constant multiplication of a standard deviation of a learned face color model in accordance with Equation (2) below.

$$f(x, y) = \begin{cases} 1 & \text{if } I_{cr}(x, y) < k\sigma_{cr} \text{ and } I_{cb}(x, y) < k\sigma_{cb} \\ 0 & \text{else,} \end{cases} \quad (2)$$

Figure 6:
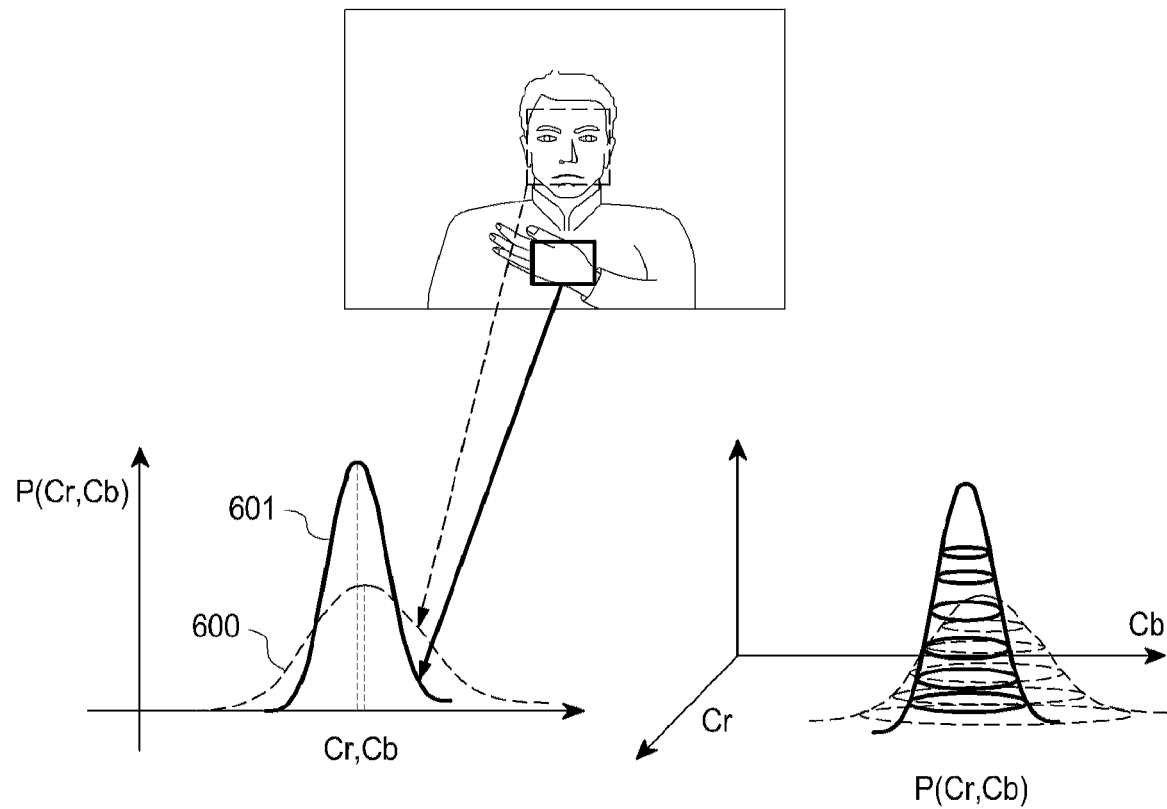
FIG. 6 is a graph illustrating that color values corresponding to a face have a Gaussian normal distribution pattern, according to an embodiment of the present invention.

Here, $I_{cr}(x,y)$ and $I_{cb}(x,y)$ respectively denote color values in cr and cb channels at an (x,y) position, $\sigma_{cr}$ and $\sigma_{cb}$ respectively denote standard deviation values of the cr and cb channel colors in a reference face area, and k denotes a user-defined constant. Referring to FIG. 6, since color values 600 corresponding to a face includes colors of elements, such as glasses, shadows, hair, and eyebrows, the color values 600 have a wider range, and thus, a larger standard deviation value than color values 601 corresponding to a hand area.

Specifically, since most color values corresponding to a face correspond to a skin color, a difference between a mean of the color values 600 corresponding to a face and a mean color probability distribution value corresponding to the hand area is not large.

When the color values 600 corresponding to a face have a Gaussian normal distribution pattern, ale skin color learning unit 120 determines the skin color as color values within constant multiplication of a standard deviation of a learned face color model as shown in FIG. 6.

Figure 7:
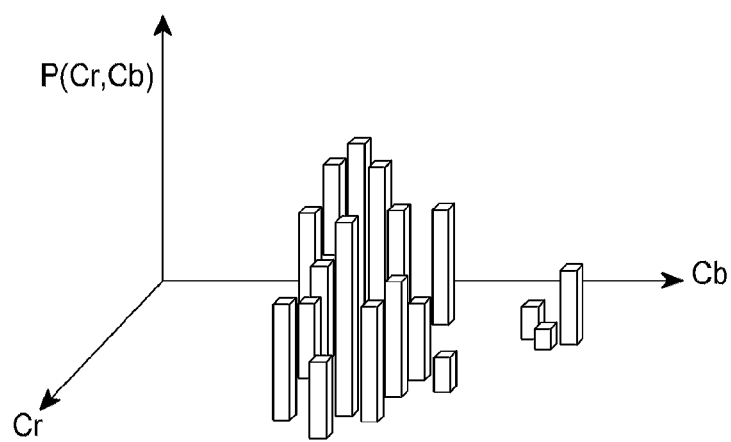
FIG. 7 is a histogram illustrating that color values corresponding to a face have a non-parametric pattern, according to an embodiment of the present invention.

When the color values 600 corresponding to a face have a non-parametric pattern, the skin color learning unit 120 determines the skin color corresponding to the hand area by using an approximated form of a histogram instead of using an operation of an exponential function in order to show a continuous probability distribution. The histogram is displayed in a 3-dimensional space as shown in FIG. 7. Pixels having a probability value greater than 0.6 are defined as the skin color corresponding to the hand area.

Accordingly, the skin color learning unit 120 uses Equation (3) to learn color values corresponding to the hand area.

$$p(u) = \{p_i(u)\}_{u=1 \ldots m} \quad (3)$$

$$\sum_{i=1}^{m} p_i = 1$$

$$f_h(x, y) = \begin{cases} 1 & \text{if } p_i(b_{cr}(x, y), b_{cb}(x, y)) > 0.6 \\ 0 & \text{else} \end{cases}$$

Here, $\{p_i(u)\}_{n=1 \ldots m}$ denotes a histogram having m bins, $b_c\bullet(x,y)$ denotes a function of mapping a color value of a pixel corresponding to an (x,y) position to a bin of the histogram, and color values satisfying both Equations (2) and (3) are determined as the skin color corresponding to the hand area. Errors may occur in detection of a hand area according to the skin color when an object having color values similar to those of a face exists around the hand area, or when a standard deviation of the face color probability distribution 600 is different from that of the hand color probability distribution 601. In order to address these errors, the hand area detector 150 may extract the skin color from an area in which movements are detected, using Equation (4).

$$DI(x, y) = \begin{cases} 1 & \text{if } \|I_{t-2}(x, y) - I_{t-1}(x, y)\| > \theta \text{ or} \\ & \|I_{t-1}(x, y) - I_t(x, y)\| > \theta \\ 0 & \text{else} \end{cases} \quad (4)$$

Here, $I_t(x,y)$ denotes a brightness value at an (x,y) position in a t-th image, and $\theta$ denotes a user-defined threshold. DI(x, y) denotes a difference image representing a movement at the (x,y) position in an image, wherein a value of DI(x,y) is 0 when there is no movement.

For example, the hand area detector 150 may calculate a difference value between 3 consecutive image frames, using Equation (4) and may select as the hand area pixels identified as the skin color from among pixels having a calculated difference value greater than the user-defined threshold, using Equations (2) and (3).

Referring again to FIG. 2, in step 203, the movement-accumulated image generator 130 generates a movement-accumulated image obtained by sequentially accumulating areas showing movements in a pre-set number of image frames.

Figure 8:
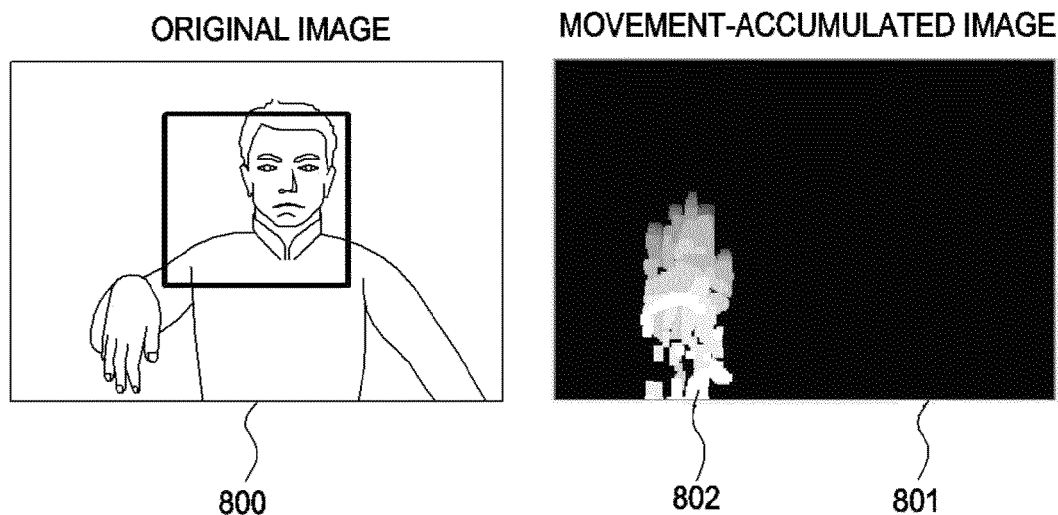
FIG. 8 is a diagram illustrating a process of generating a movement-accumulated image, according to an embodiment of the present invention.

For example, as shown in FIG. 8, a movement-accumulated image 801 is generated by accumulating areas 802 showing hand movements in an original image 800.

This movement-accumulated image $CDI_d(x,y)$ may be generated in accordance with Equation (5) below.

$$CDI_d(x, y) = \begin{cases} T & \text{if } DI(x, y) > 0 \\ 0 & \text{else if } CDI_d(x, y) < T - d, \end{cases} \quad (5)$$

Here, DI(x,y) denotes a difference image value at an (x,y) position. For a pixel of which movement is detected from a difference image, a value of the movement-accumulated image is set to T. By subtracting 1 from the value of the movement-accumulated image every time there is no movement in a difference image, when a value of CDI is less than T−d, the value of the movement-accumulated image is set to 0.

In step 204, the movement-accumulated area detector 140 detects a movement-accumulated area by using the movement-accumulated image generated by the movement-accumulated image generator 130. Specifically, the movement-accumulated area detector 140 detects a movement-accumulated area as an area having a movement-accumulated value greater than 0 in a movement prediction area set by a movement starting action around a face area detected in the movement-accumulated image. An area showing the greatest movement in the movement-accumulated area has the highest movement-accumulated value, and an area showing no movement has a movement-accumulated value of 0.

In step 205, the hand area detector 150 detects a hand area corresponding to the skin color learned by the skin color learning unit 120 in the detected movement-accumulated area. The hand area includes pixels, which have a color value corresponding to the skin color and which have been associated with movement.

In step 206, the hand movement information detector 160 detects movement information of the detected hand area. In an embodiment of the present invention, the detection of a movement direction is provided as an example.

Specifically, the hand movement information detector 160 sets a hand movement-accumulated area by accumulating a movement trajectory along which the hand area has sequentially moved based on a position at which the hand area is detected. The hand movement information detector 160 detects a movement direction while a size of the set hand movement-accumulated area is increasing.

Figure 9:
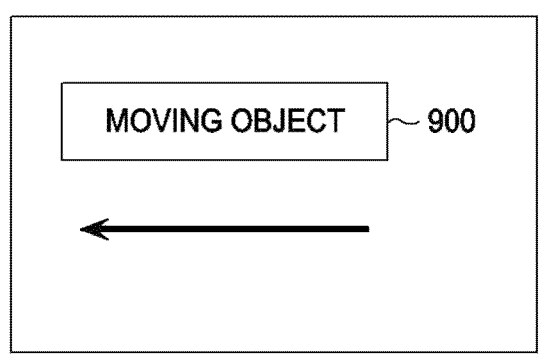
FIGS. 9 to 13 are diagrams illustrating a process of detecting hand movement information, according to an embodiment of the present invention.

For example, as shown in FIG. 9, a size of a hand movement-accumulated area increases as a moving object 900 moves from the right to the left.

Figure 10:
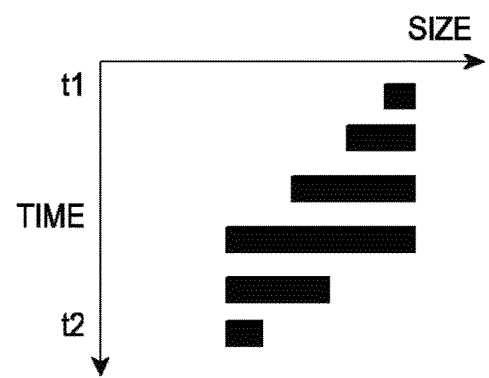

FIG. 10 illustrates a change of a size of a movement-accumulated area of a moving object along time. As shown in FIG. 10, the size of the movement-accumulated area of the moving object increases when the moving object moves and decreases when the moving object does not move.

Figure 11:
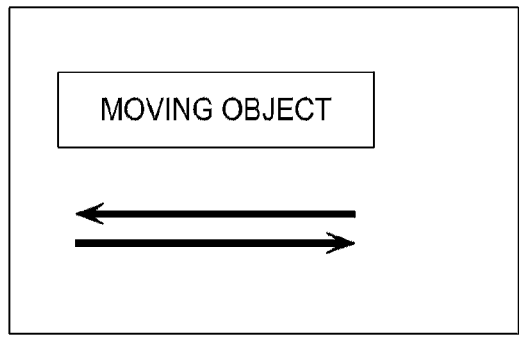
Figure 12:
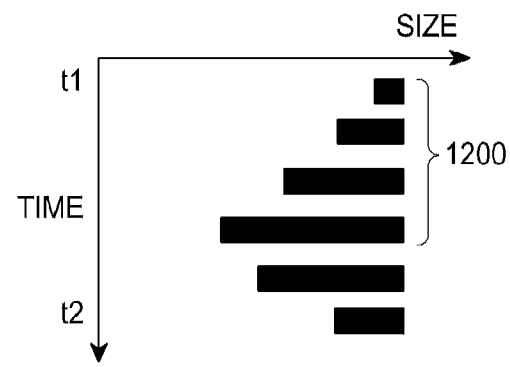

When there are back-and-forth hand movements as shown in FIG. 11, since a movement area size increases in a movement-initiated direction and decreases in the opposite direction, the hand movement information detector 160 may recognize hand movements by determining a movement direction only if a size of a movement-accumulated area is increasing, as shown by 1200 of FIG. 12.

To determine the movement direction, the hand movement information detector 160 detects the maximum movement area showing the greatest movement among movement areas.

Thereafter, the hand movement information detector 160 measures movement transitions in the detected maximum movement area and calculates a direction of the greatest movement transition having the greatest value among the measured movement transitions in accordance with Equation (6) below.

$$\text{Direction} = \max_i \text{abs}\left(\sum_{t=0}^{N} x_{t+1}^i - x_t^i\right), \text{ for } i = 1, \ldots, 4. \quad (6)$$

Here, i=1, . . . , 4 denotes an index indicating an up, down, left, or right direction, and t denotes an index of a consecutive image frame used to determine a transition in a movement area.

For consistency of the movement determination, the hand movement information detector 160 sets a movement determination reference area to determine hand movements, using an initializing operation, and recognizes hand movements in the set movement determination reference area.

Figure 13:
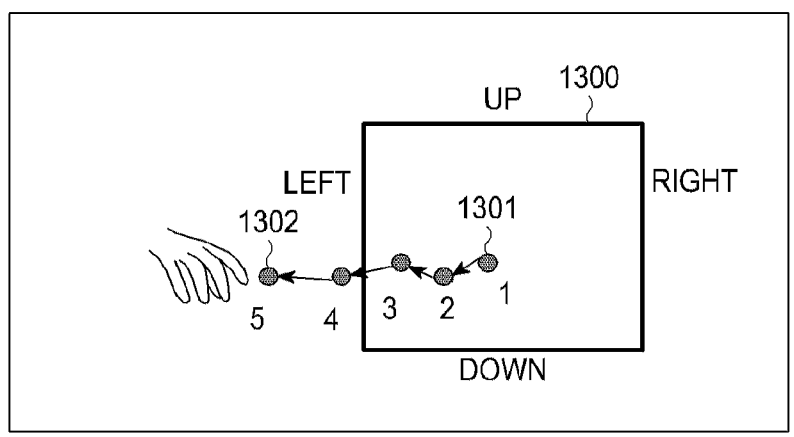

Specifically, as shown in FIG. 13, the hand movement information detector 160 recognizes a hand movement direction if a hand position is greater than a pre-set threshold from a starting point 1301 of a movement trajectory in a movement determination reference area 1300 and is located out of the movement determination reference area 1300.

The hand movement information detector 160 determines whether an ending point 1302 of the movement trajectory is located within a threshold from the border of the movement determination reference area 1300, and if the ending point 1302 of the movement trajectory is not located within the threshold from the border of the movement determination reference area 1300, the hand movement information detector 160 ends recognizing the hand movement direction.

Referring again to FIG. 2, in step 207, the user interface screen forming unit 170 forms a user interface screen by using the detected hand area movement information and outputs the formed user interface screen.

Figure 14:
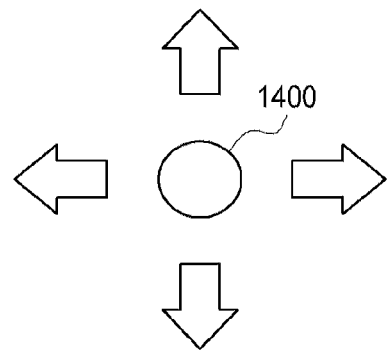
FIGS. 14 to 17 are diagrams illustrating a user interface formed in correspondence with hand movement information, according to an embodiment of the present invention.

In order to allow a user to intuitively recognize his/her hand position, the user interface screen forming unit 170 forms a graphic user interface to visually indicate a relative hand movement according to hand area movement information, as shown in FIG. 14.

For example, as shown in FIG. 14, the user interface screen forming unit 170 may show a relative hand position as a variable ball-shaped graphic image 1400 and show up, down, left, and right directions with respect to the graphic image 1400 as arrow-shaped graphic images.

Figure 15:
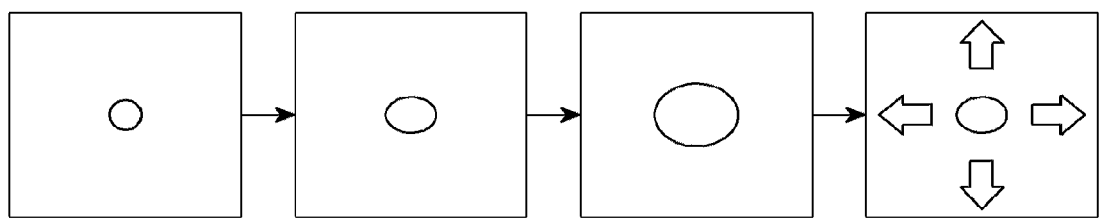

In order to indicate activation of an operation for hand movement recognition, the user interface screen forming unit 170 may adjust a size of the ball-shaped graphic image, as shown in FIG. 15.

Figure 16:
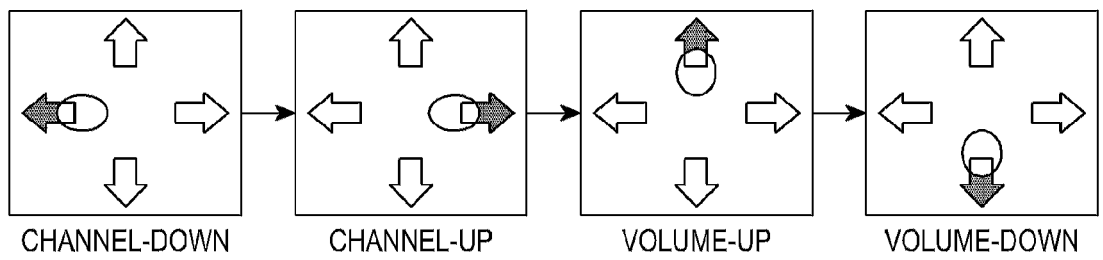

The user interface screen forming unit 170 may place the ball at the center of the arrow-shaped graphic images when no hand movement is recognized. The user interface screen forming unit 170 changes an arrow color and moves a ball position up, down, left, or right in accordance with a recognized hand movement direction as shown in FIG. 16.

In embodiments of the present invention, in order to allow the user to be able to intuitively infer a control command through a hand movement, control commands according to movement information may be previously set. For example, for operational control commands for controlling a TV, control commands according to movement information as shown in Table 1 may be previously set.

TABLE 1

| Control command | Hand movement |
|---|---|
| Start operation | Wave a hand left and right |
| Channel-up | Move the hand to the right |
| Channel-down | Move the hand to the left |
| Volume-up | Move the hand upwards |
| Volume-down | Move the hand downwards |

As is apparent from the foregoing description, embodiments of the present invention may provide a user interface, which can be installed in low-priced systems. The user interface can quickly and simply sense hand movements, by detecting a hand area, corresponding to a color extracted through skin color learning according to face detection, from a movement-accumulated image, and recognizing movements in the detected hand area.

Additionally, embodiments of the present invention are more convenient for a user, because the user modifies an incorrect operation by himself/herself through the user interface to increase a movement recognition rate.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A user interface apparatus that uses movement recognition, comprising:
 a skin color learning unit for detecting a skin color from a reference face area of an image;
 a movement-accumulated area detector for detecting a movement-accumulated area, in which movements are accumulated, from sequentially accumulated image frames;
 a movement detector for detecting movement information corresponding to the skin color from the detected movement-accumulated area; and
 a user interface forming unit for creating and displaying a user interface screen using the detected movement information.

2. The user interface apparatus of claim 1, further comprising a face detector for detecting the reference face area from the image.

3. The user interface apparatus of claim 2, wherein the face detector determines whether a plurality of faces are detected from the image, and when the plurality of faces are detected, the face detector detects the reference face area in accordance with whether one or more of the plurality of faces are located in a center of the image and relative sizes of the plurality of faces.

4. The user interface apparatus of claim 1, wherein the skin color learning unit learns a color probability distribution value of the reference face area.

5. The user interface apparatus of claim 1, further comprising a movement area detector for detecting a movement area corresponding to the skin color from the detected movement-accumulated area, wherein the movement information is detected from the movement area of the movement-accumulated area.

6. The user interface apparatus of claim 5, wherein the movement area detector detects the movement area as having pixels with color values that correspond to the skin color in the detected movement-accumulated area, while a size of the movement-accumulated area is increasing.

7. The user interface apparatus of claim 5, wherein the movement information comprises a direction and a position of the movement area.

8. The user interface apparatus of claim 7, wherein the direction of the movement area is a direction in which a size of a movement trajectory area increases, and wherein the movement trajectory area is obtained by accumulating a trajectory along which the movement area has moved.

9. The user interface apparatus of claim 1, wherein the user interface forming unit generates an icon corresponding to the movement area and creates a screen in which the generated icon corresponds to the movement information.

10. The user interface apparatus of claim 1, further comprising a movement-accumulated image generator for generating, from the image, the movement-accumulated image in which the image frames, which show the movements, are sequentially accumulated.

11. A movement recognition method for a user interface, the method comprising the steps of:
 detecting a skin color from a reference face area of an image;
 detecting a movement-accumulated area, in which movements are accumulated, from sequentially accumulated image frames;
 detecting movement information corresponding to the skin color from the detected movement-accumulated area; and
 creating and displaying a user interface screen using the detected movement information.

12. The method of claim 11, further comprising detecting the reference face area from the image.

13. The method of claim 11, wherein detecting the reference face area comprises:
 determining whether a plurality of faces are detected from the image; and
 when the plurality of faces are detected, detecting the reference face area in accordance with whether one or more of the plurality of faces are located in a center of the image and relative sizes of the plurality of faces.

14. The method of claim 11, wherein detecting the skin color comprises:
  calculating a color probability distribution value of the reference face area.

15. The method of claim 11, further comprising detecting a movement area corresponding to the skin color from the detected movement-accumulated area, wherein the movement information is detected from the movement area of the movement-accumulated area.

16. The method of claim 15, wherein detecting the movement area comprises detecting the movement area as having pixels with color values that correspond to the skin color in the detected movement-accumulated area, while a size of the movement-accumulated area is increasing.

17. The method of claim 15, wherein the movement information comprises a direction and a position of the movement area.

18. The method of claim 17, wherein the direction of the movement area is a direction in which a size of a movement trajectory area increases, and wherein the movement trajectory area is obtained by accumulating a trajectory along which the movement area has moved.

19. The method of claim 11, wherein forming the user interface screen comprises:
  generating an icon corresponding to the movement area; and
  creating a screen in which the generated icon corresponds to the movement information.

20. The method of claim 11, further comprising generating, from the image, the movement-accumulated image in which the image frames, which show the movements, are sequentially accumulated.

* * * * *